United States Patent
Deuter et al.

(10) Patent No.: US 7,173,909 B2
(45) Date of Patent: Feb. 6, 2007

(54) DIAGNOSTIC DEVICE FOR A FIELD BUS WITH CONTROL-INDEPENDENT TRANSFER OF INFORMATION

(76) Inventors: Andreas Deuter, Brinkstr 2, 32825 Blomberg (DE); Dietmar Schönherr, Heinrich Heine Str. 16, 32657 Lemgo (DE)

( * ) Notice: Subject to any disclaimer, the term of this patent is extended or adjusted under 35 U.S.C. 154(b) by 997 days.

(21) Appl. No.: 10/112,315

(22) Filed: Mar. 27, 2002

(65) Prior Publication Data

US 2002/0154603 A1 Oct. 24, 2002

(30) Foreign Application Priority Data

Apr. 19, 2001 (DE) ................................ 101 19 151

(51) Int. Cl.
*G06F 11/00* (2006.01)
(52) U.S. Cl. ...................... 370/242; 702/183
(58) Field of Classification Search ................ 370/242; 702/183
See application file for complete search history.

(56) References Cited

U.S. PATENT DOCUMENTS

| | | | |
|---|---|---|---|
| 6,108,616 A * | 8/2000 | Borchers et al. ............ | 702/183 |
| 6,466,216 B1 * | 10/2002 | Gotze et al. ................ | 345/501 |
| 6,587,900 B1 * | 7/2003 | Wischinski .................. | 710/68 |
| 6,611,724 B1 * | 8/2003 | Buda et al. .................. | 700/49 |
| 6,744,735 B1 * | 6/2004 | Nakaguro .................... | 370/242 |
| 6,788,980 B1 * | 9/2004 | Johnson ....................... | 700/1 |
| 6,952,404 B2 * | 10/2005 | Hayashi et al. ............. | 370/242 |

FOREIGN PATENT DOCUMENTS

| | | |
|---|---|---|
| DE | 10008020 A1 | 8/2000 |
| DE | 29913057 U1 | 9/2000 |

OTHER PUBLICATIONS

Elektronik Praxis, Issue 23 p. 108-110.
Inside Ole Second Edition Kraig Brockschmidt, Microsoft Press, 1985.
Activex Controls Inside Out Adam Cenning, Microsoft Press, 1987.
Elektro Automation, Mar. 2001, p. 32.

* cited by examiner

*Primary Examiner*—Hassan Kizou
*Assistant Examiner*—Anthony Sol
(74) *Attorney, Agent, or Firm*—Charles E. Baxley

(57) ABSTRACT

A diagnostic device that may be included in a superior-level application, for example as an ActiveX component with a software interface standardized for this purpose. The superior-level application may be a visualization application of a control application or a visualization at the control level. The diagnostic device receives diagnostic data for a field bus from a field bus switching component. The diagnostic data is transmitted via a PLC I/O bus and interfaces provided in the PLC, without the need to parameterize or program either the control application or the visualization application.

16 Claims, 3 Drawing Sheets

DIAGNOSTIC DEVICE FOR A FIELD BUS WITH CONTROL-INDEPENDENT TRANSFER OF INFORMATION

BACKGROUND OF THE INVENTION

1. Field of the Invention

The present invention relates to a diagnostic device for a field bus which outputs diagnostic information and parameters, as well as certain information about peripheral properties, to a display instrument for display and evaluation.

2. Description of the Prior Art

As the use of field bus systems in control systems becomes more and more widespread, the importance of tools for the rational commissioning and maintenance of such field bus systems is constantly growing. A diagnostic device for a field bus is known from the technical article published in "Elektronik Praxis, issue 23, pp. 108–110". The diagnostic device described therein fulfils the object of providing diagnostic data for a field bus in the form of a clear text message or a visual display, as a histogram for example, for long-term analyses. In terms of content, the display provides visual identification of fault locations in the event of sporadic transmission errors, monitoring quality in fibre optic lines and messages from bus modules regarding faults on associated peripherals.

However, the critical disadvantage of this device is that the logical and physical connection between the field bus switching component and the diagnostic device is assured via a purpose-designed interface connection between the field bus switching component and the computer with diagnostic device, such as Ethernet or V24.

A visualization system is known from DE 299 13 057 U1, in which the logical and physical connection between the programmable logic controller PLC and a visualization application is assured by an interface provided for that purpose (for example V24 or Ethernet). For additional field bus switching components connected to the PLC, the interface that is located in the field bus switch must be used to transmit the diagnostic data contained in the field bus switch. It is not possible for the diagnostic information contained in the PLC to be transferred to the diagnostic device.

The standardized software interface for ActiveX components is known from "Inside OLE Second Edition, Kraig Brockschmidt, Microsoft Press, 1985" and "ActiveX Controls Inside Out, Adam Denning, Microsoft Press, 1987".

"Elektro Automation, 3/2001, Page 32", includes a description and illustration of the typical data communication mechanism for a diagnostic device for a field bus. In this case, programming effort is required within the control unit in order to transfer the data in the control unit to a diagnostic device. To avoid costly programming activities, the diagnostic device is integrated in a visualization application as an ActiveX software component. Since the transmission path of the diagnostic data from the field bus to the diagnostic devices no longer passes through the controller, an additional interface connection is required therefor.

A diagnostic device in a process controlling system is known from DE 100 08 020 A1. In this case, however, only measurement and control variables from the application are monitored, and a fault is output to the display or action is initiated. The diagnostic device in DE 100 08 020 A1 is a constituent part of the control device, since the performance of the control program is influenced by the diagnostic device. The diagnostic device described has the critical disadvantage that it does not monitor the functioning of a field bus or process control network.

SUMMARY OF THE INVENTION

The object of the present invention is to provide a diagnostic device that may be included in a superior-level application, for example as an ActiveX component with the standardized software interface. The superior-level application may be a visualization of the control application or a visualization at the control level. The diagnostic device receives the diagnostic data for the field bus from the field bus switching component. The diagnostic data is transmitted via the PLC I/O bus and the interface provided in the PLC. Both the control application and the visualization application are unaffected by the transmission of the diagnostic data for the field bus and need not be considered for purposes of programming or use. Since no additional interface connection is provided for transmitting diagnostic data between the field bus switching component and the diagnostic device, the internal PLC I/O bus, the external interface for the PLC, and the external interface in the computer are used.

The diagnostic device for a field bus according to the present invention is a software component that is integrated in a superior-level application via a standardized software interface and is run via that interface. The diagnostic device preferably has the form of an ActiveX component with the standardized software interface provided therefor. The term ActiveX component is used to a describe a software component that may be integrated in a main application via a standardized software interface to the main application. The ActiveX component is attached to the main application before the main application is launched or during runtime thereof.

The interface on the computer has the task of communicating the diagnostic data from the external interface of the computer to the diagnostic device within the computer. In the PLC, the diagnostic data is transmitted from the field bus switching component to the external interface of the PLC via the interface in the PLC. No modifications or programming changes need to be made to the control application in the PLC in order for the diagnostic device to function. No modifications or programming changes need to be made to the visualization application on the computer to enable the transfer of the diagnostic data that the diagnostic device needs in order to function.

The present invention will be described in the following with reference to an exemplary embodiment and the associated figures.

DESCRIPTION OF REFERENCE NUMERALS UTILIZED IN THE DRAWING

1: Programmable logic controller PLC
2: Interface in the PLC
3: Control application, PLC program
4: Field bus switching component, central unit for the field bus system
5: I/O units, input or output units for the PLC
6: PLC I/O bus, internal bus of the PLC or PLC extension bus
7: External interface of the PLC
8: Logical I/O interface of the bus connecting circuit to the PLC I/O bus
9: External interface of the bus connecting circuit
10: Display device, computer for control-specific visualization application
11: Diagnostic device for a field bus
12: Interface in the computer
13: Visualization application, software component 14: Diagnostic data for a field bus, transmitted via the PLC I/O bus
15: Logical connection between the computer interface and the diagnostic device for a field bus, inside the computer
16: Logical connection between control application and the external interface of the PLC, inside the PLC
17: External interface of the computer
18: Data link between PLC and computer
19: Link for diagnostic data for a field bus
20: Data link between PLC and computer
21: Field bus circuit (schematic)
22: Field bus node, for connecting multiple slave bus modules
23: Bus modules, contain inputs and outputs for the control application
24: Fault point in the field bus
25: Bus module
26: Bus module downstream of the fault point
27: Field bus
28: Software interface for ActiveX component

DETAILED DESCRIPTION OF THE PREFERRED EMBODIMENT

Figure 1:
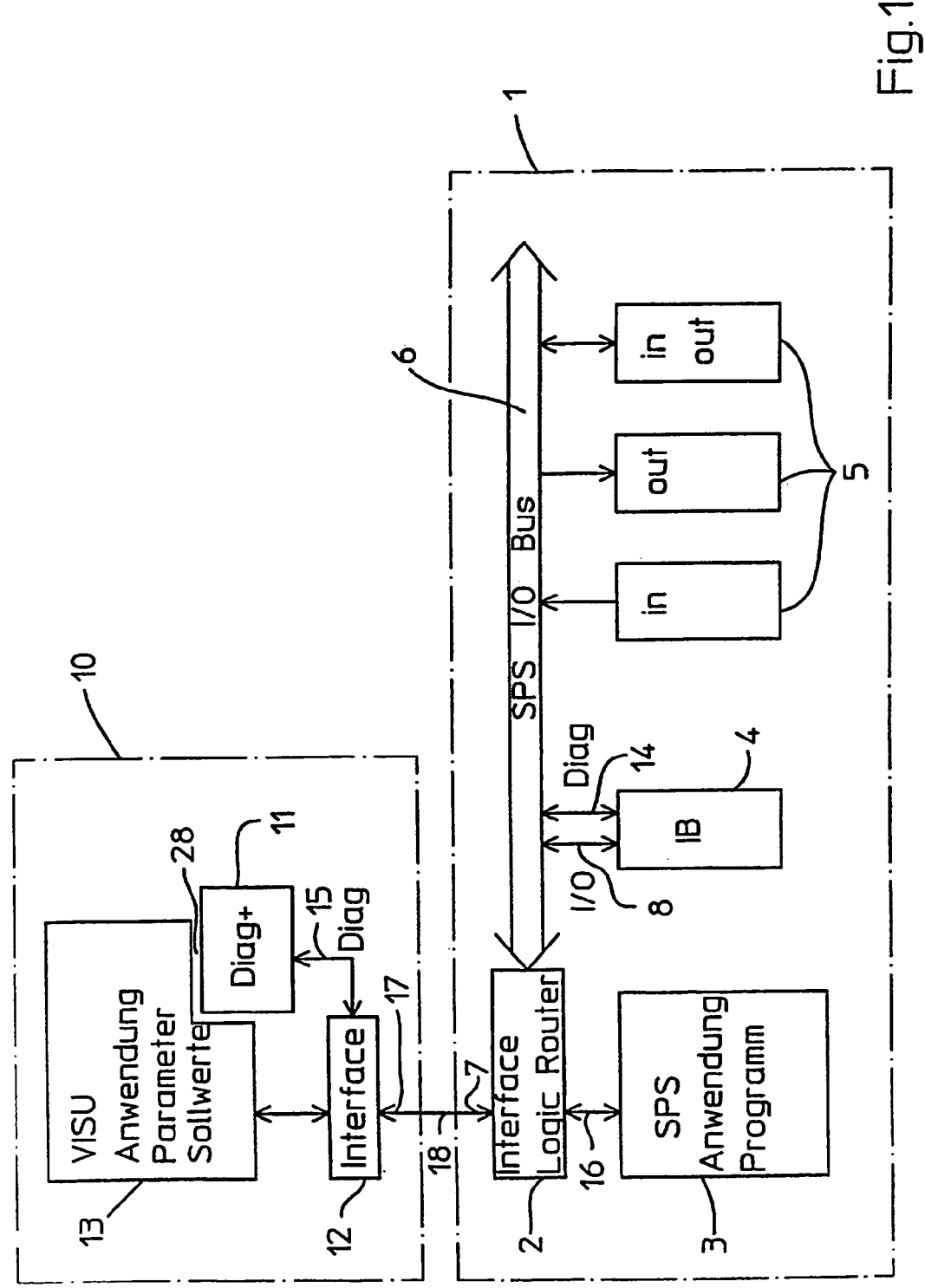
FIG. 1: shows the diagnostic device for a field bus according to the present invention, which receives the diagnostic information via the external interface located in the PLC.

FIG. 1 shows the arrangement according to the present invention with a diagnostic device 11 for a field bus. Diagnostic data 14 specific to the field bus is stored in a field bus switching component 4 prior to further processing in the diagnostic device 11. The field bus switching component 4 with its I/O interface 8 is coupled to a PLC I/O bus 6 located in a PLC SPS 1, so that the field bus switching component 4 may be addressed in the same way as I/O units 5 by a control application 3. Frequently, a display device 10 is connected to the PLC 1, and contains a visualization application 13 associated with the control application 3. All essential information is carried over a data link 18 between an external interface 7 of the PLC 1 and an external interface 17 of a computer. The diagnostic device 11 is activated as an additional component in the display device 10, which collects the diagnostic data 14 about the field bus for further processing or visual display. To enable transmission of the diagnostic data 14 from the field bus switching component 4 to the diagnostic device 11 without a need to modify or program the control application 3 or the visualization application 13, interfaces 2, 12 handle the corresponding data allocation. The diagnostic device 11 is operated from the visualization application 13 via a software interface 28. Feedback signals from the diagnostic device 11 also pass through this software interface 28 to the visualization application 13.

Transmission of the diagnostic information 14 from the field bus switching component 4 to the diagnostic device 11 will now be described. The diagnostic information 14 concerning the field bus that is stored in the field bus switching component 4 is transferred to the interface 2 in the PLC 1 via the PLC I/O bus 6. A link for the diagnostic information 14 from the field bus switching component 4 and the PLC I/O bus 6 is adapted to match the PLC I/O bus 6 and may also be purely logical in nature. Both I/O data and the diagnostic information 14 for the field bus is transmitted via the PLC I/O bus 6 to the interface 2 in the PLC 1. The interface 2 in the PLC 1 switches logical connections. The diagnostic information 14 is routed to the external interface 7 of the PLC 1. The I/O data is routed to the control application 3 via an internal logical link 16. Visualization information from the control application 3 reaches the interface 2 of the PLC 1 via the internal logical link 16, and is forwarded from that interface to the external interface 7 of the PLC 1. The external interface 7 of the PLC 1 may be a V24 interface or an Ethernet interface, or an interface for a different transmission mode, such as parallel transmission.

The visualization information and the diagnostic information 14 for the field bus is received in the display device 10 with the visualization application 13 via the external interface 17 in the computer. The interface 12 in the computer routes the received information either to the visualization application 13 or to the diagnostic device 11 depending on its allocation. Visualization information is routed to the visualization application 13, the diagnostic information 14 is routed to the diagnostic device 11 via an internal logical channel 15. Functional property of the visualization application 13 is not affected thereby. Switching of all logical links can also be done in the reverse direction, so that commands and parameters originating from the diagnostic device 11 and destined for the field bus switching component 4 can be transmitted via the data link 18 and the PLC I/O bus 6. Parameters or programs for the control application 3 can be transmitted to the PLC 1 via the data link 18 from the visualization application 13. Of course the application 13 on the computer may also be a programming application for the PLC 1 or a configuration or programming application for the field bus. The interface 12 in the computer may take the form of a programmable data processing unit or a component arranged as a hardware device.

Figure 2:
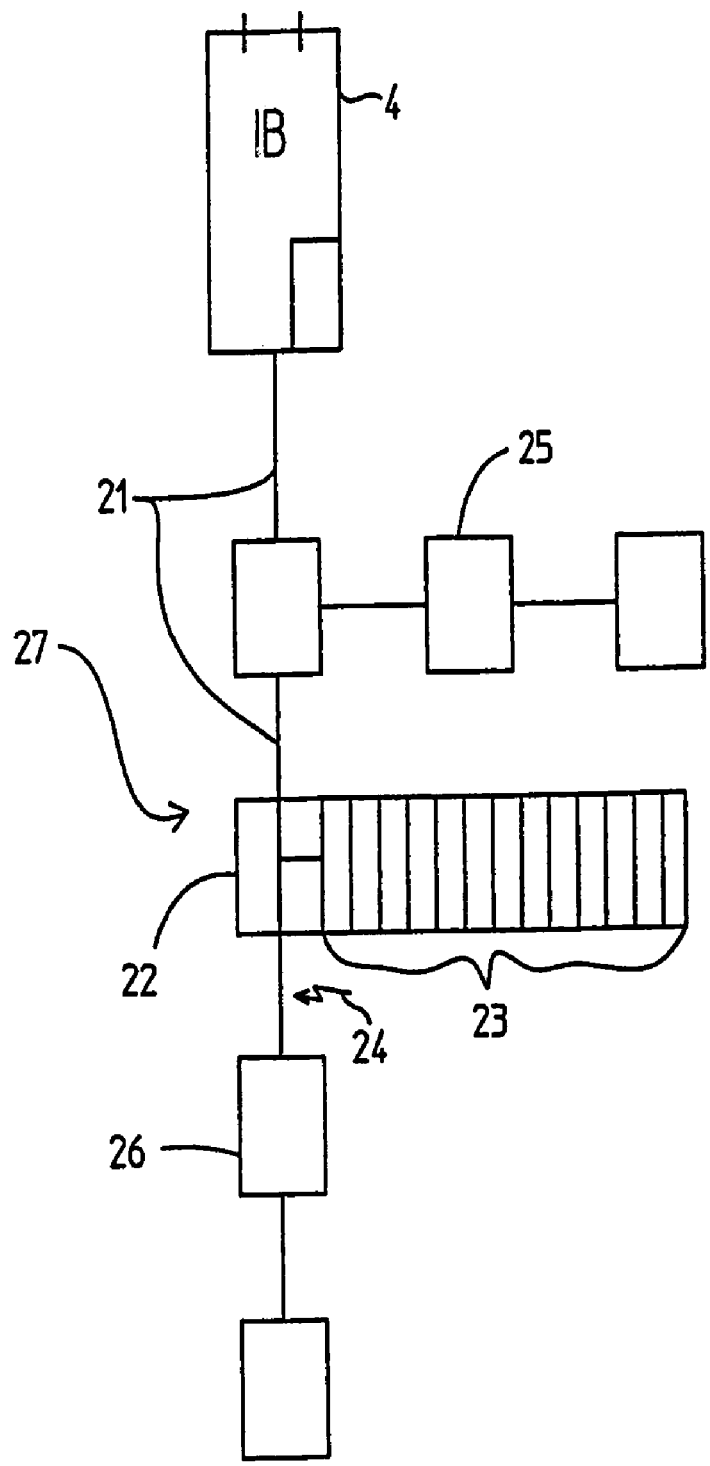
FIG. 2: shows an example of a field bus layout.

FIG. 2 shows an exemplary configuration in which a field bus 27 is connected to the field bus switching component 4. This may be, for example, an INTERBUS system, but may equally be a different field bus system. Typically, the field bus 27 includes bus circuits 21 and modules 23, 25, 26, connected thereto, which are furnished with peripheral wiring to serve as connections for sensors or actuators or others instruments associated with automation technology.

A bus terminal 22 is shown for purposes of illustrating the INTERBUS system only, to demonstrate coupling of the multiple bus modules 23 into a functional grouping. A fault 24 on the connection circuit upstream of the module 26 generates an error that is stored in the field bus switching component 4 together with as much information as possible (type, duration, location of fault, etc.).

Figure 3:
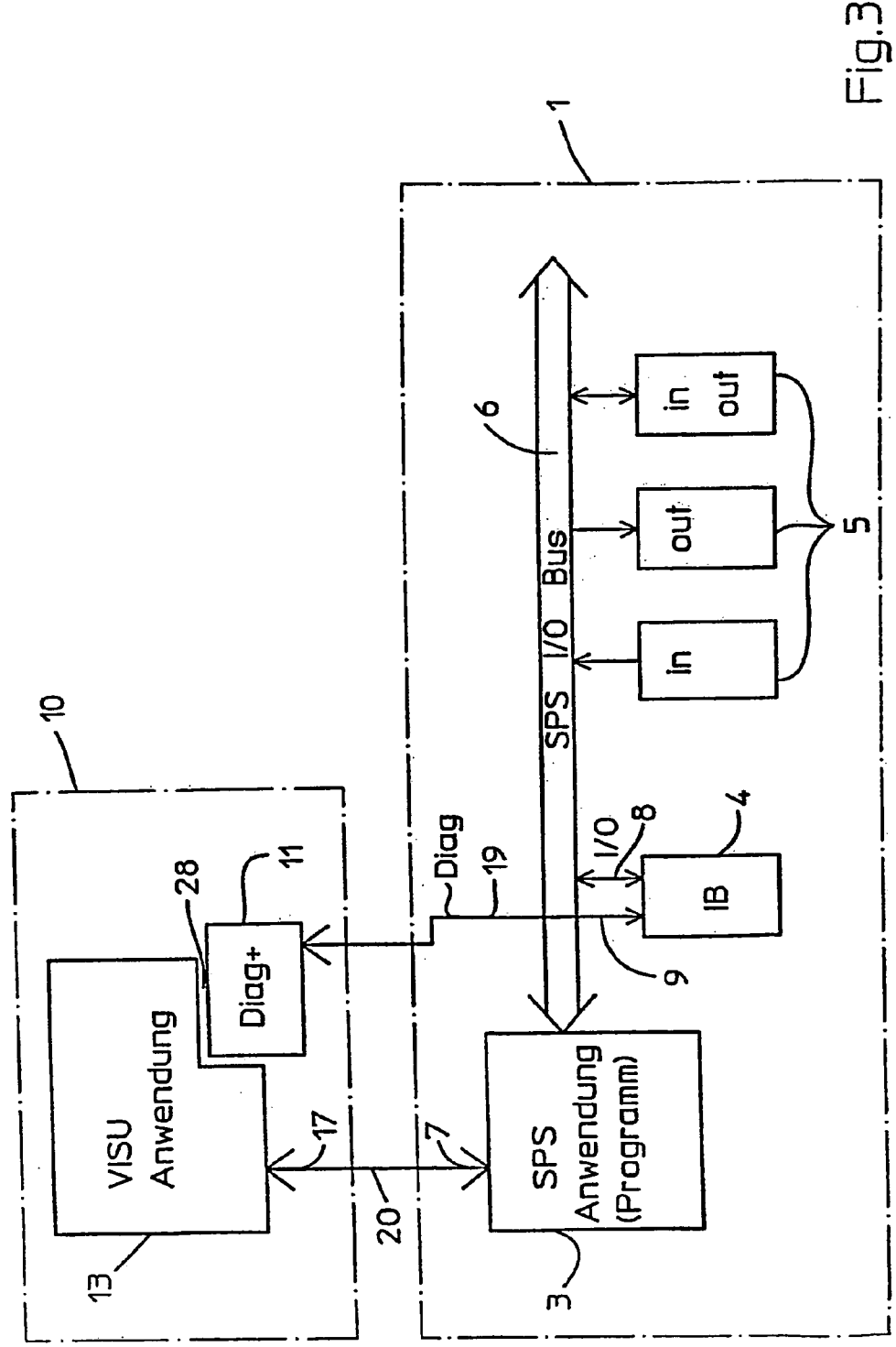
FIG. 3: shows a diagnostic device for a field bus such as is already known in the art.

FIG. 3 shows a diagnostic tool designed according to the known art for receiving diagnostic information. A physical connection 19 provided specifically for this purpose transports the diagnostic information to the diagnostic device 11. In the reverse direction, commands and parameters for running the bus may be sent from the diagnostic device 11 to the field bus switching component 4. The PLC I/O bus 6 contains only I/O data, so that the control application 3 can receive this data directly. A data link 20 between the interfaces 7 and 17 carries only visualization information or other control-related data from the control application 3, and in the other direction it carries only control related parameters or programs from the visualization application 13 destined for the control application 3.

The invention claimed is:

1. A diagnostic system comprising:
   a) a diagnostic device (11) for a field bus (27), which outputs for display at a display device (10) field bus-related information including non-recurring transmission errors, persistent signal loss with location information, and line quality of fibre optic lines; and
   b) a PLC (1) including
      a field bus switching component (4);
      a control application; and
      a logic router (2);
   wherein the diagnostic information is routed by said field bus switching component (4) via an internal bus (6) of said PLC (1) to an interface (7) of said PLC (1), without affecting said control application (3).

2. The diagnostic system according to claim 1, wherein said control application (3) does not require any programming activities that are associated with said diagnostic device (11) in a programming phase.

3. The diagnostic system according to claim 1 or 2, wherein transfer of the diagnostic information within said PLC (1) is performed by an interface (2) of said PLC (1), which consists of a software programmable data processing unit.

4. The diagnostic system according to claim 1 or 2, wherein transfer of the diagnostic information within said PLC (1) is performed by an interface (2) of said PLC (1), which consists of a hardware component designed specifically for this purpose.

5. The diagnostic system according to claim 1, wherein an interface (12) on the display device (10) handles logical distribution of information to be transmitted, wherein the diagnostic information is communicated to said diagnostic device (11) and information destined for a visualization or a programming application is communicated to said visualization or said programming application (13).

6. The diagnostic system according to claim 5, wherein said diagnostic device (11) is integrated as an Active-X component into an existing application (13) on the display device (10).

7. The diagnostic system according to claim 5, wherein said diagnostic device (11) receives the diagnostic information from said visualization application via a standardized interface for ActiveX components.

8. The diagnostic system according to claim 5, wherein an existing application (13) on the display device (10) is a visualization application (13).

9. The diagnostic system according to claim 5, wherein an existing application (13) on the display device (10) is a programming application for said PLC (1).

10. The diagnostic system according to claim 5, wherein an existing application (13) on the display device (10) is a configuration application or a programming application for the field bus (27).

11. The diagnostic system according to claim 3, wherein an interface (12) on the display device (10) handles logical distribution of information to be transmitted, wherein the diagnostic information is communicated to said diagnostic device (11) and information destined for a visualization or a programming application is communicated to said visualization or said programming application (13).

12. The diagnostic system according to claim 4, wherein an interface (12) on the display device (10) handles logical distribution of information to be transmitted, wherein the diagnostic information is communicated to said diagnostic device (11) and information destined for a visualization or a programming application is communicated to said visualization or said programming application (13).

13. The diagnostic system according to claim 6, wherein said diagnostic device (11) receives the diagnostic information from said visualization application via a standardized interface for ActiveX components.

14. The diagnostic system according to claim 6, wherein an existing application (13) on the display device (10) is a visualization application (13).

15. The diagnostic system according to claim 6, wherein an existing application (13) on the display device (10) is a programming application for said PLC (1).

16. The diagnostic system according to claim 6, wherein an existing application (13) on the display device (10) is a configuration application or a programming application for the field bus (27).

* * * * *